United States Patent
Scheidt et al.

(10) Patent No.: US 7,490,240 B2
(45) Date of Patent: *Feb. 10, 2009

(54) ELECTRONICALLY SIGNING A DOCUMENT

(75) Inventors: Edward M. Scheidt, McLean, VA (US);
James L. Kolouch, Vienna, VA (US);
Ersin L. Domangue, Woodbine, MD
(US); Mark A. Odell, Ashburn, VA
(US); Wai Lin Tsang, Falls Church, VA
(US)

(73) Assignee: TecSec, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/673,755

(22) Filed: Feb. 12, 2007

(65) Prior Publication Data

US 2007/0277040 A1   Nov. 29, 2007

Related U.S. Application Data

(62) Division of application No. 10/035,817, filed on Oct. 25, 2001, now Pat. No. 7,178,030.

(60) Provisional application No. 60/242,713, filed on Oct. 25, 2000.

(51) Int. Cl.
*H04L 9/00* (2006.01)
*H04L 9/28* (2006.01)
*H04L 9/24* (2006.01)

(52) U.S. Cl. .................. 713/176; 713/171; 713/168; 713/185; 380/277; 380/260; 380/259; 380/280; 380/30; 380/55; 380/243; 380/245; 283/17

(58) Field of Classification Search .................. None
See application file for complete search history.

(56) References Cited

U.S. PATENT DOCUMENTS

| | | | |
|---|---|---|---|
| 5,195,133 A | 3/1993 | Kapp et al. | |
| 5,208,853 A | 5/1993 | Armbruster et al. | |
| 5,347,580 A | 9/1994 | Molva et al. | |
| 5,442,707 A | 8/1995 | Miyaji et al. | |
| 5,647,017 A | 7/1997 | Smithies et al. | |
| 5,659,616 A | 8/1997 | Sudia | |
| 5,844,988 A | 12/1998 | Ryan et al. | |
| 5,867,578 A | 2/1999 | Brickell et al. | |
| 6,035,402 A | 3/2000 | Vaeth et al. | |
| 6,079,621 A | 6/2000 | Vardanyan et al. | |
| 6,185,685 B1 | 2/2001 | Morgan et al. | |
| 6,209,091 B1 | 3/2001 | Sudia et al. | |
| 6,212,277 B1 | 4/2001 | Miyaji | |
| 6,401,206 B1 * | 6/2002 | Khan et al. | 713/176 |
| 6,490,680 B1 | 12/2002 | Scheidt et al. | |
| 6,553,494 B1 * | 4/2003 | Glass | 713/186 |
| 6,907,529 B1 * | 6/2005 | Hirose | 726/5 |
| 7,178,030 B2 * | 2/2007 | Scheidt et al. | 713/176 |

\* cited by examiner

*Primary Examiner*—Syed A. Zia
(74) *Attorney, Agent, or Firm*—IP Strategies

(57) ABSTRACT

A method of electronically signing a document includes initializing a user, including generating an asymmetric key pair including a private signing key and a public signing key, and storing the private signing key and the public signing key; and providing an electronic signature, including receiving document data corresponding to at least one selected portion of the document, binding the stored private signing key and the document data to create an electronic signature, and providing the electronic signature for a recipient.

18 Claims, 5 Drawing Sheets

El-Sig Personalization

ELECTRONICALLY SIGNING A DOCUMENT

CROSS REFERENCE TO RELATED APPLICATIONS

This is a divisional of U.S. patent application Ser. No. 10/035,817, which was filed on Oct. 25, 2001, now U.S. Pat. No. 7,178,030, which issued on Feb. 13, 2007 and is related to, and claims the priority benefit of, the following co-pending U.S. patent applications: U.S. Provisional Patent Application Ser. No. 60/242,713, filed on Oct. 25, 2000; and U.S. patent application Ser. No. 09/023,672, filed on Feb. 13, 1998 by Edward M. Scheidt and C. Jay Wack.

BACKGROUND OF THE INVENTION

1. Field of Invention

The present invention is related to a method of electronically signing a document; a device for use in electronically signing a document; and a computer-readable medium that includes instructions for the computer to carry out a method of electronically signing a document.

2. Background Information

Historically, handwritten signatures have been used to identify a particular person and to bind that person to a particular document. A person's signature on a particular document supported the assertion that the person read and/or agreed to the document's content. However, handwritten signatures are subject to forgery.

Imprinting seals have also been historically used for these purposes, with and without accompanying handwritten signatures. However, the reliability of a seal is directly related to the level of difficulty, or overall cost, in replicating or counterfeiting the seal. Further, the value of a seal also depends on whether it is recognized or trusted.

Third-party witnesses have been used to lend further credence to the validity of a particular signature on a particular document. A third-party witness, such as a notary, may also use a difficult-to-reproduce seal. However, this system too depends on whether a verifier accepts the validity or veracity of the third-party attester.

In the past, most commerce was practiced within limited regional areas and within a limited homogenous population, such that the verification of signatures was relatively easy and repudiation claims were resolved quickly. At present, however, the advent of electronic commerce and a global economy has created a need for a method of electronically signing a document and corresponding device.

Electronic third-party schemes, such as digital signatures with digital certificates issued and verified by third parties under a Public Key Infrastructure ("PKI"), have proven to be cumbersome. This is especially evident when independent and unrelated PKIs, which may further be unfamiliar with each other, may be required to blindly, or even negligently or recklessly, trust representations made by each other.

Therefore, there is a need for a method of electronically signing a document and corresponding device. There is also a need to strengthen the written signature-based authentication of documents in a traditional two-party signed transaction using electronic, computer-based authentication mechanisms. There is also a need to strengthen third-party adjudication of the hand-written signature-based authentication of documents with computer-based authentication mechanisms. This should be able to be provided in addition to two-party authentication, and should be able to be applied forensically, that is, to provide evidence during a dispute.

BRIEF SUMMARY OF THE INVENTION

The present invention can be embodied in a method of electronically signing a document, a device adapted to carry out a method of electronically signing a document, and a computer readable medium including instructions for the computer to carry out a method of electronically signing a document. The present invention can be used to bind a graphic representation of a written signature to a document or to certain key elements of a document. The present invention can also be used to prevent or provide resistance to counterfeiting of the written signature, and to mathematically bind a written signature to a person or entity.

In an exemplary embodiment of the invention, a method of electronically signing a document includes initializing a user, including generating an asymmetric key pair including a private signing key and a public signing key, and storing the private signing key and the public signing key; and providing an electronic signature, including receiving document data corresponding to at least one selected portion of the document, binding the stored private signing key and the document data to create an electronic signature, and providing the electronic signature for a recipient.

In a further exemplary embodiment of the invention, in a method of electronically signing a document, initializing a user may further include receiving signature data corresponding to at least one handwritten signature provided by the user, and storing the signature data; and binding includes binding the stored private signing key, the stored signature data and the document data to create the electronic signature.

According to another aspect of the invention, an electronic signature device includes a processor, a memory, a user input device including a first signature input device, and a device interface, all communicatively connected by at least one bus. A method of personalizing the electronic signature device to a user includes receiving a digitized written user signature of the user via the first signature input device, and generating a prime parameter, a sub-prime parameter, and a base parameter. A signing private key is generated, as well as a signing public key based on the prime, sub-prime, and base parameters, a user public key based on the user private key and the prime and base parameters, and a biometric electronic template based on the digitized written user signature. The prime, sub-prime, and base parameters, the user private and public keys, and the biometric electronic template are all stored in the memory. The prime, sub-prime, and base parameters may be based on Diffie-Hellman parameters, and may be generated based on a seed value. The seed value may be one of a random value and a pseudorandom number. The seed value may be received from the user via the user interface. The user interface may further include a password input device, and the method may further include receiving a user password via the password input device, generating a password encryption key based on the user password, encrypting a known value with the password encryption key to produce an encrypted output, and storing the encrypted known value in the memory. The known value may be the biometrics electronic template. Receiving the digitized user signature may be repeated at least once. Receiving the digitized user signature and generating the biometrics electronic template may be repeated at least once. The biometric electronic template may be generated based on a mathematic transformation of the digitized written user signature. The mathematical transformation may be a Fourier transformation. The electronic signature device may be communicatively connected to a certificate authority via the device interface, and the method may further include sending a certificate request to the certificate authority, receiving a certificate package from the certificate authority, and storing the certificate package in the memory. The certificate request may include user public key. The certificate request may further include at least one of the prime, sub-prime, and base parameters. The certificate request may include the user public key and the prime parameter. The certificate package may include a digital certificate. The certificate package may be a digital certificate and a root value. The device interface may be a card interface. The electronic signature device may further include a power source that is at least one of a battery and the computer interface. The first signature input device may be integral with the electronic signature device. The first signature input device may be connected to the at least one bus through the device interface. At least a portion of the user interface may be integral with the electronic signature device. At least a portion of the user interface may be connected to the at least one bus through the device interface. The user public key may be one of a random number and a pseudorandom number. The user public key may be smaller than the sub-prime parameter.

According to another aspect of the invention, an electronic signature device includes a processor, a memory having a biometric electronic template, a prime parameter, a sub-prime parameter, and a base parameter, user public data including a user public key, and a user private key stored therein, a user interface including a signature input device, a device interface adapted to interface a computer and at least one bus operably connected to the processor, the memory, the user interface, and the device interface. A method of originating an electronically signed transaction includes verifying whether a user is permitted to originate the electronically signed transaction with the electronic signature device, by receiving a digitized written originator signature via the user interface, and comparing the digitized written originator signature against the biometric electronic template to produce a first verification result. A transaction package is received through one of the user interface and the device interface. The transaction package and one of the digitized originator signature and a digitized user signature extracted from the biometric electronic template are combined to produce an originator signature block. An ephemeral private key is generated based on the prime, sub-prime, and base parameters, as well as an ephemeral public key based on the ephemeral private key and the prime and base parameters, and a shared encryption key based on the ephemeral public key, the user public key, and the prime parameter. The originator signature block is encrypted with the shared encryption key to produce an encrypted signature block. The encrypted signature block, the ephemeral private key, the prime parameter, and at least a portion of the user public data are combined to produce an electronically signed transaction. If the user is verified, the electronically signed transaction is provided via the device interface. The prime, sub-prime, and base parameters may be based on Diffie-Hellman parameters. The user interface may further include a password input device, and the memory may further have stored therein an encrypted known value, and verifying whether the user is permitted to originate the electronically signed transaction with the electronic signature device may further include receiving a user password via the password input device, generating a password encryption key based on the user password, and decrypting the encrypted known value with the password encryption key to produce a second verification result. The encrypted known value may be the biometrics electronic template. Receiving the digitized originator signature may be repeated at least once. Receiving the digitized originator signature and comparing the digitized written originator signature against the biometric electronic template to produce the first verification result may be repeated at least once. Comparing the digitized written originator signature against the biometric electronic template may include generating a temporary template based on the digitized written originator signature, and comparing the temporary template to the biometric electronic template. The temporary template is generated based on a mathematic transformation of the digitized written originator signature. The mathematical transformation may be a Fourier transformation. Comparing the digitized written originator signature against the biometric electronic template may include generating a temporary signature based on the biometric electronic template, and comparing the temporary signature to the digitized written originator signature. The temporary signature may be generated based on a mathematic transformation of the digitized written originator signature. The mathematical transformation may be a Fourier transformation. The at least a portion of the user public data may include the user public key.

These, and other, features and advantages of the invention will be apparent from the accompanying drawings and the detailed description that follows.

DETAILED DESCRIPTION

Figure 1:
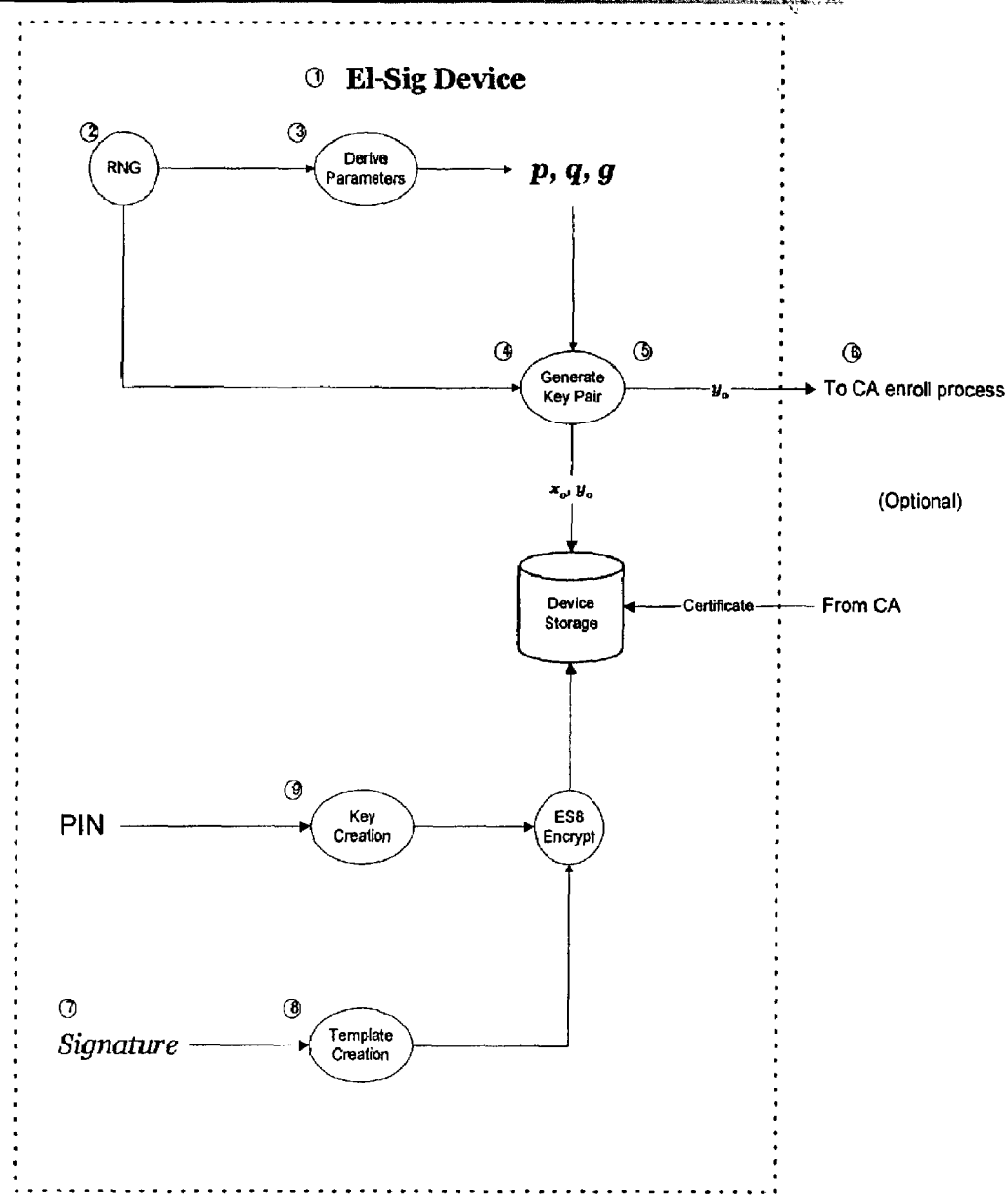
FIG. 1 shows an exemplary personalization process according to the invention.

The present invention is described in further detail, including reference to exemplary embodiments shown in the accompanying figures. The exemplary embodiments are only presented to facilitate disclosure of the invention, and are not limiting of the inventive concept to any particular feature, order of actions, aspect, feature, or embodiment disclosed.

Terminology

As used herein, the following terminology shall have definitions that are no more narrow than as set forth below.

1. The term document means any written communication, whether on paper, stored or transmitted digitally as ASCII, word processing, or other type of data, stored or transmitted digitally as a graphic file, or stored or transmitted as a fax.

2. The term signed document means a document accompanied by a written signature.

3. The term written signature means a hand-written signature by the originator of the signed documents. This written signature can be on paper; stored or transmitted digitally as a graphic file, such as a bitmap, jpeg file, gif file, tiff file (this will be called a GROWS (Graphic Representation Of a Written Signature)); stored or transmitted digitally as a vector file, which contains more information pertaining to the creation of the signature than does the graphic file, such as direction of travel from a point and speed at any given point (this will be called a DROWS (Digital Representation Of a Written Signature)).

4. The term authentic means that the identity of the person claiming origination of a document is, in fact, the claimed identity and that the person is not an imposter (Origin authentication); a document has not been altered, either maliciously or accidentally, from its original intended form (Message integrity); and the originator cannot deny creation or transmission of the document (Non-repudiation).

5. The term mathematically bound means that a value has been provided with the bound elements which has been calculated from all of those elements, and that there is only a very small probability (for example, on the order of $2^{-80}$, or approximately $10^{-24}$, or less) that this value could have come from other than all of the bound elements. The bound elements can be stored or transmitted digitally or able to be entered into a computer for performing the calculation of the above value.

6. The term El-Sig document means a document accompanied by a graphic representation of a written signature (GROWS) and an El-Sig block.

7. The term El-Sig block is a set of data that is a digitally encoded. The encoding can be stored and/or transmitted electronically or it can be printed on a written document in barcode form. The El-Sig block can include the user's id and public signing key or the user's digital certificate; a digital signature on the document and GROWS; the static or watermarked (in an optional watermark embodiment) GROWS; the encrypted digital signature and DROWS (in an optional biometric embodiment); the key of the previous step encrypted with a user encryption key (in an optional biometric embodiment); the initialization vector (IV) used to encrypt the digital signature and DROWS (in an optional biometric embodiment, optional because the encryption algorithm may not require an IV); the notary's id and public key or the notary's digital certificate (in an optional notarial embodiment); and the notary's digital signature on the GROWS (in an optional notarial embodiment).

8. The term user is the first-party or originator of the El-Sig document.

9. The term recipient refers to the second party or the recipient of the El-Sig document. The recipient can use the graphical representation of the written signature as attesting to the authenticity of the document, as with a normal written signature. The recipient can also gain greater assurance in the documents authenticity by performing the electronic verification process on the El-Sig document.

As will be appreciated by those of skill in the art, a GROWS does not provide sufficient information to compute meaningful biometrics scores against a written signature template. It cannot be used to generate a DROWS that successfully verifies against the biometrics template belonging to the user's hand-written signature. More technically, the group of DROWS that can be generated from the GROWS will produce false-accept rates for biometric matching against a known template less than 0.01 percent of the time, according to the ANSI X9.84 standard. However, a DROWS does provide sufficient information to compute successful biometrics scores against a written signature template.

It is assumed that parties utilizing the present invention will ensure that certain elements, such as the private part of the user's El-Sig signing key pair, the user's El-Sig encryption key, and the user's hand-written signature biometrics template, are secured. That is, it is up to the respective parties to ensure that measures are taken to keep keying material and other sensitive data confidential, if the parties want to enhance the security of a communication or transaction. Physical and cryptographic measures may be used by the parties to this end, but such techniques are not part of the scope of this document.

The method of the present invention begins with actions taken by an originator of a document, who will be referred to herein as a user. Optionally, the method may involve a recipient, who in some cases cannot be identified. According to an optional notarial embodiment of the present invention, a third-party may also be involved. The third-party acts as a notary and attests that he or she witnessed that a hand-written signature was executed by the user. The third-party will have (or will be provided with) the necessary hardware and software for converting a hand-written signature into an electronic form for use by a digital computer. The hardware may include a scanner, PDA utilizing a pen stylus, or a graphics tablet, and the software may include any that is appropriate for the chosen hardware device.

Accordingly, the identity of originator, or the uid, may be used by the method of the present invention. This uid can be, for example, an e-mail address, a distinctive name, computer user account, or some other identifying feature of the user. The identity may be relative to the third-party, if present. The identity of the recipient is optional. If utilized, the actual form of the recipient id may be different than the uid. For example, a uid may be a distinctive name, whereas the identity of the recipient may be an e-mail address. According to the notary option, the identity of the notary third-party may be utilized. Accordingly, a self-escrow id may appear as a third-party id.

The method of the present invention is utilized in conjunction with a document, or with certain portion(s) of the document. The document, or the selected portion(s), is bound to the graphical representation of the user's written signature.

According to an optional biometric embodiment of the present invention, a vector representation of the user's written signature (DROWS) is created using a graphics tablet and accompanying pen, or other signature vector-capturing device. The device used to accept the written signature (for example, the graphics tablet) is attached to a computer. Software on the computer can translate, store and use the data from this device. The terms "computer" and "computing device", as used herein, broadly cover any class of computing device, including, for example, any apparatus that includes a microprocessor and that can process instructions necessary to carry out the method of the invention.

A graphic representation of a written signature (GROWS can be created directly from the DROWS or from a scanned-in signature. As noted previously, the DROWS cannot be created from the GROWS. The GROWS can take the form of a bitmapped file or gif file, for example, and can be displayed to show the signature on a computer monitor or printed hard copy. An El-Sig block is created from at least the document and the GROWS. Optionally, a printed version of the document, hand-written signature, and El-Sig block may be provided, although all of these elements may exist only in electronic form.

A bar-code print of the El-Sig block may also be provided. When no hard-copy printout of the El-Sig document exists, the data in the El-Sig block exists electronically and the bar code graphic can still accompany the El-Sig document.

A cryptographic hash algorithm may also be used in the method of the present invention. Although any known algorithm can be used, the cryptographic strength of this algorithm affects the overall security of the method. An exemplary algorithm is the U.S. Secure Hash Algorithm (SHA-1), as described in FIPS PUB 180-1.

A cryptographic asymmetric key digital signature algorithm may also be used in the method of the present invention. Although any known algorithm can be used, the cryptographic strength of this algorithm affects the overall security of the method. An exemplary algorithm is the U.S. Digital Signature Algorithm (DSA), as described in FIPS PUB 186.

A cryptographic symmetric key, asynchronous stream encryption algorithm may also be used in the method of the present invention. A block cipher may be utilized as long as it is used in an asynchronous streaming mode, for example, cipher feedback mode. Although any known algorithm can be used, the cryptographic strength of this algorithm affects the overall security of the method. An exemplary algorithm is the U.S. Advanced Encryption Standard algorithm, also known as Rijndael, used in cipher feedback mode.

A cryptographically strong random number generator (RNG) or pseudo-random number generator (PRNG) may also be used in the method of the present invention. Many generators utilizing different algorithms are known to those of skill in the art. An exemplary algorithm is described in Appendix 3 of FIPS PUB 186.

According to an optional watermark embodiment of the present invention, watermark algorithm may be utilized. Preferably, this algorithm should be persistent, that is, attempts at altering the watermark should leave traces of the watermark sufficient to recover the data within the watermark. This option is most advantageous if the notary option is not used.

There are many applications for use of the present invention. For example, the present invention may be used when a user writes a personal check to a second party. In this exemplary application, the third-party may be the user's bank, and the uid may be the user's account number. Key elements of the transaction may include the date, the amount of the check, an identifying bank number, the user's account number, a check number, and the identity of the recipient. The check printed from computer, and the barcode printed on the check. The recipient is the party to whom the check is made out. Alternatively, the bank can be the first party, and the recipient the second party. The national bank number would then be the uid. The account number on the check would be included as one of the key elements.

Another exemplary application is one in which a user purchases a money order from a bank to send to a second party. In this example, the third-party is the user's bank, and recipient identification is optional. Key elements of the transaction may include the date, the amount of the money order, the bank number, and money order number. The money order may be printed from a computer such that it includes a barcode. As with the personal check example, the bank may instead be the first party, the recipient being the second party. The person who sends the money order would be just an agent in the process.

Another exemplary embodiment is one in which a graduate receives a diploma from college. The user in this example is the dean (or whoever signs the diploma), the recipient is the graduate, and the third-party is the college or a university accreditation facility. Key elements could include the name of the college, the date, the degree type (for example, bachelor of science), the subject area (for example, electrical engineering), and the name of the dean (or the signor of the diploma). The diploma may be printed from a computer and bar-coded.

Other exemplary applications include Uniform Commercial Code contracts, boned warehouse seals, bills of lading, and evidence tags, verification for financial instruments, legal agreements, signed, sworn, or notarized documents, drug prescriptions, medical order verification, purchase orders, work orders, change orders, and the like, evidence tags, airline baggage tags, high-value inventory verification, bonded warehousing, shipping seals for packages and trucks, labels for high value parts subject to counterfeiting, identification cards; and professional certificates.

Exemplary Embodiment

In a particular embodiment of the present invention, the method includes three main actions: 1) initialization of the user and possibly enrollment with a third-party entity; 2) user preparation of the document and transmission thereof; and 3) recipient verification of the user's written signature. A forth action, namely, resolution of a dispute, may be utilized, for example by third-party verification of the user's written signature.

As shown in FIG. 1, initialization includes the creation and storage (and escrow) of cryptographic keys and a hand-written signature. This includes generating a user El-Sig signing key pair. If, for example, this key pair is a DSA key pair then parameters—p, q, and g—will be also be generated. The user's El-Sig encrypting key, for example, a symmetric cryptographic algorithm key, is then generated. Alternatively, the key pair may be an asymmetric cryptographic algorithm key pair.

If the optional biometric embodiment is utilized, a hand-written signature biometrics template is created. This is effected by the user's handwriting his or her signature using the signature-capturing device, preferably several times. Conceptually speaking, the algorithm for generating the template will combine all instances of these hand-written signatures and then create the template from some composite of these measurements. The GROWS then can be generated from the DROWS, if the biometric option is utilized, or by simply scanning a hand-written signature in any case.

If the notary option is utilized a notary third party creates a digital signature on the GROWS and the uid.

Certain personal data for the user, such as the uid, is stored, according to this exemplary embodiment, as the user's personal El-Sig data. The user's El-Sig signing key pair (and parameters, if any) is also stored and, with the uid may be combined into a digital certificate. The signor of this certificate could be a well-known certificate authority. It can also be the notary, if used, or can be self-signed by the user. The ISO X.509 standard for digital certificates is an example by which the certificate may be created. Certificate extensions or attribute certificates may accompany this certificate. For example, use of this signing key pair limited for El-Sig purposes may appear as an attribute certificate. The GROWS of the user's hand-written signature may also be stored.

According to an optional biometrics embodiment, the user's El-Sig encryption key and hand-written signature biometrics template may also be stored. According to an optional notarial embodiment, identification of a notary third-party and the notary's verification public key may be stored, and may be combined into a digital certificate. The ISO X.509 standard for digital certificates is an example by which the certificate may be created. A digital signature on the GROWS and uid by the notary can also be stored, according to this optional embodiment.

In order to store the El-Sig encryption key and private part of the signing key pair securely, encryption with a password-generated key, for example, may be performed by the user. Alternatively, or in addition to this, the hand-written biometrics verification process can serve as the user identification mechanism that grants authorization to use this personal data. Holding the El-Sig encryption key and private part of the signing key pair on a token that can be carried by the user add may also add strength to the security. Examples of such a token include smart cards and USB key fobs.

The confidentiality of this personal data can also be strengthened cryptographically by binding a randomly chosen cryptographic key value with the biometrics template. This cryptographic key is used to encrypt the rest of the personal data. However, it is preferable that the key value is not able to be deduced from the biometrics template alone; only a biometrics measurement that successfully matches against the template should allow release of the random key value. A means to periodically change the password and/or cryptographic key may be utilized to maintain a prudent level of security.

If the notary option is used, initialization should take place in-person with the notary. Official documents establishing a person's identity (for example, a birth certificate, passport, or drivers license) may be used for stronger binding of a person's identity.

Figure 2:
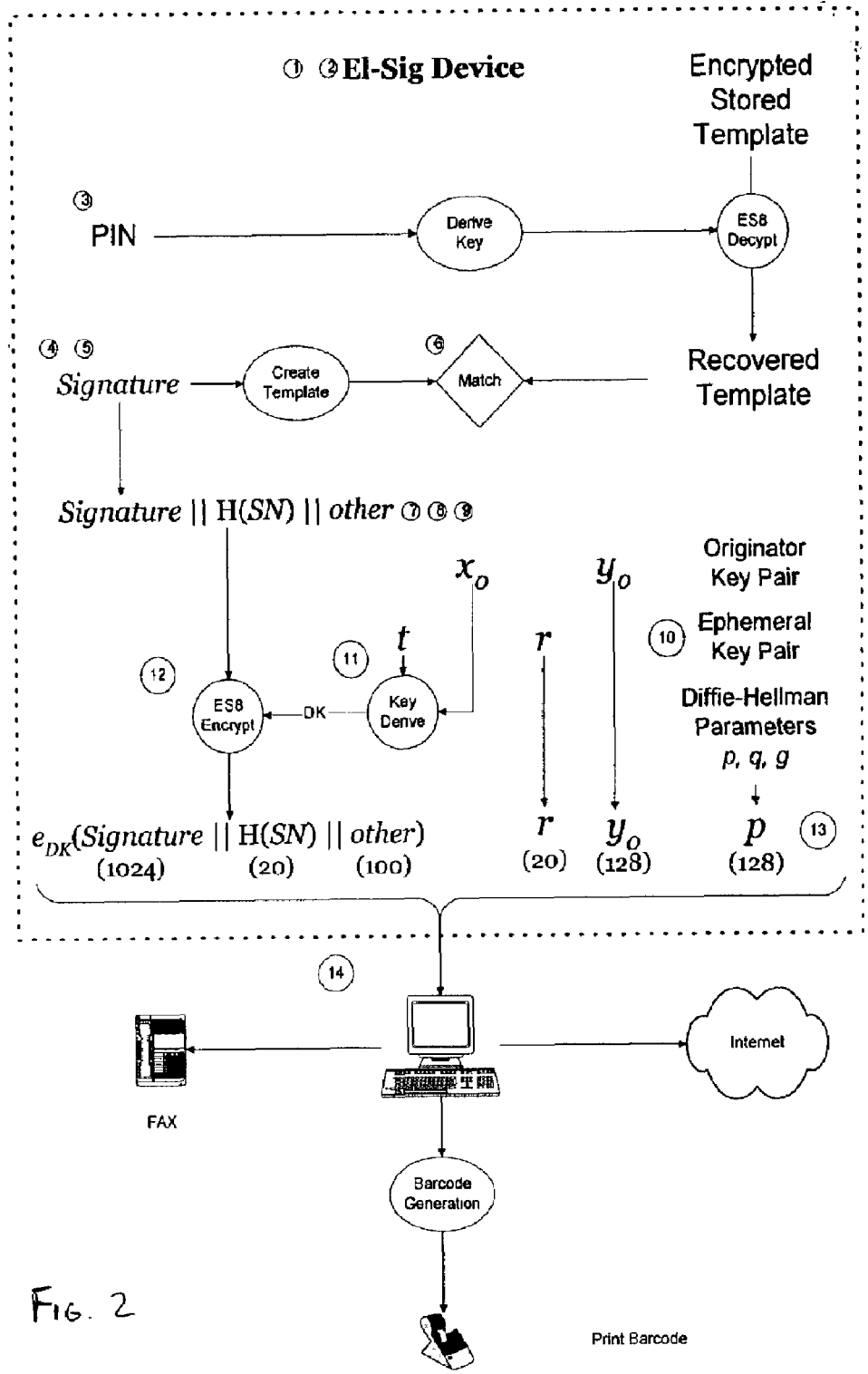
FIG. 2 shows an exemplary origination process according to the invention.

As shown in FIG. 2, the exemplary process of creating an El-Sig document utilizes a computing device, appropriate software, the user's personal El-Sig data, and, optionally, hand-written signature capturing hardware, such as a graphics tablet, that is connected to the computer. The user retrieves his or her El-Sig data. If the data is held on a token, the token is presented. If a password-generated key was used to encrypt this data, the correct password is entered.

If hand-written biometrics verification is used to grant access to this data, the user writes his/her signature on the hand-written signature capture device. The hand-written signature is digitized, creating a DROWS for this El-Sig document. If any other type of biometrics verification is required to grant access, an appropriate biometrics measurement is produced. According to the biometrics option, the DROWS and hand-written signature biometrics template are matched. If the match is not successful, the process shuts down, or a predetermined number of retries may be allowed. If the predetermined number of retries is exceeded without success, the process shuts down. If a cryptographic key that is needed to decrypt the user's El-Sig personal data is bound to the hand-written biometrics template, this key value can now be retrieved from the template and used to decrypt the personal data.

The user or the application software identifies the key elements of the document that are to be used by the El-Sig process. Optionally, the user may identify the recipient of the El-Sig document. The key elements of the document, the recipient id (if provided), and the GROWS are concatenated and hashed according to a cryptographic hash algorithm. If the watermark option is utilized, the GROWS is watermarked with the hash value. Preferably, the watermark option is only utilized if the notary option is not utilized.

A digital signature using the user's El-Sig private signing key is created using the key elements of the document, the static or watermarked GROWS, and the recipient's id (if provided).

If the biometrics option is utilized, the digital signature and DROWS are concatenated and then encrypted with a randomly generated key (CEK). The CEK is encrypted with the user's El-Sig encryption key. If the encryption algorithm is a block cipher used in a streaming mode, such as cipher feedback mode, then an initialization vector (IV) will be generated randomly with the CEK.

The El-Sig block is then created. According to this exemplary embodiment, it includes the user's identity, and the public part of the user's El-Sig signing key pair or the user's El-Sig digital certificate, as well as the digital signature and the static or watermarked GROWS, and the recipient's id, if provided. If the biometrics option is utilized, the El-Sig block may also include one or more of the encrypted digital signature and DROWS, the encrypted key (encrypted CEK), and the IV used to encrypt the digital signature and DROWS (if generated). If the notary option is utilized, the El-Sig block may also include one or more of the notary's id and public key or the notary's digital certificate, and the notary's digital signature on the GROWS and user id.

The El-Sig block then may be converted to a barcode format such as, for example, the PDF417 format. The El-Sig block and the static or watermarked GROWS are then appended or otherwise attached to the original document to create an El-Sig document. In electronic form, the El-Sig block may appear twice—once in digital form, and once in graphic, barcode form.

Optionally, a paper copy (for example, for postal mailing or faxing) of the El-Sig document may be created. The El-Sig document is printed with a graphics capable printer (for example, a dot-matrix, laser, or ink-jet printer). The El-Sig block is represented in bar code format on the printed document, and the GROWS is printed in graphics form on the printed document.

Figure 3:
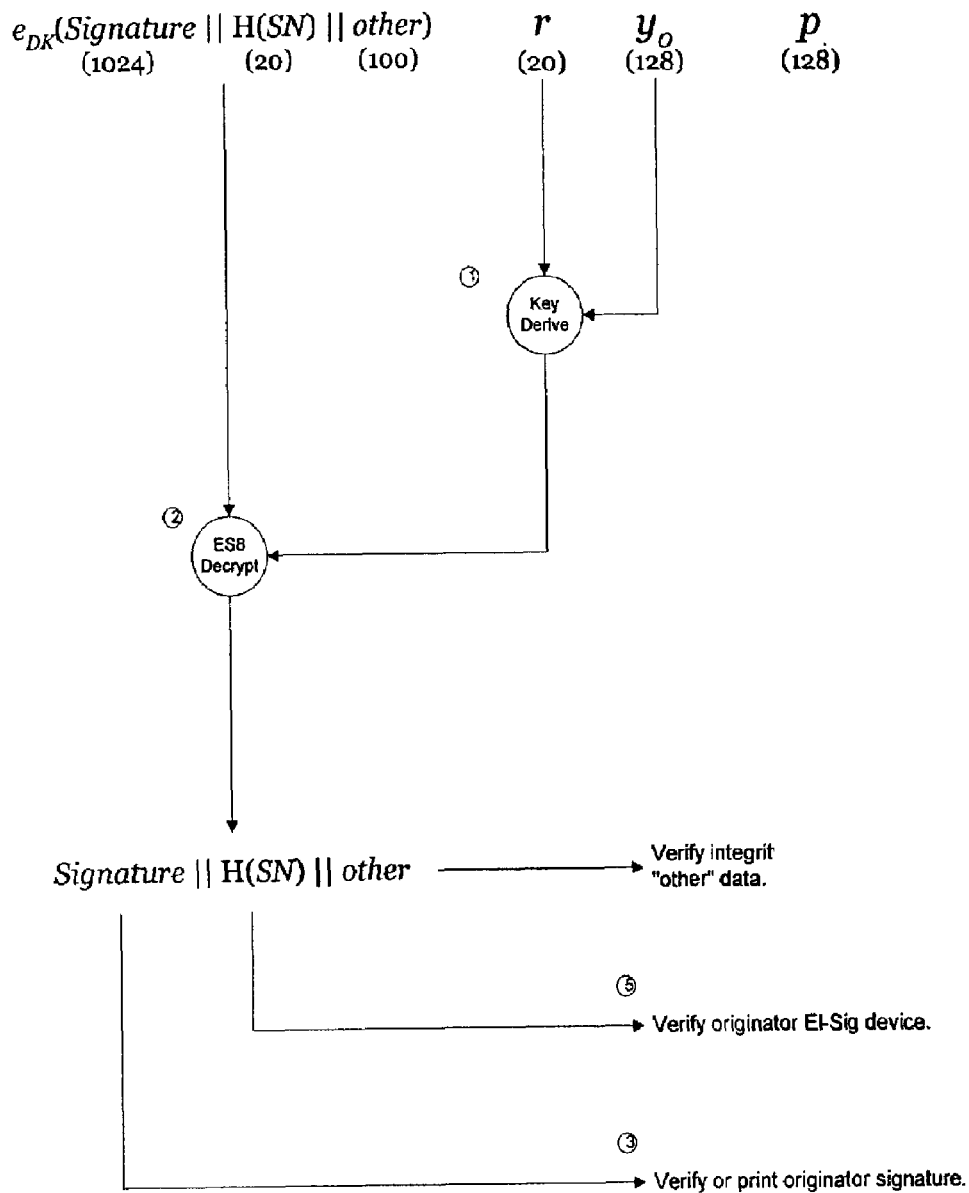
FIG. 3 shows an exemplary recipient process, for origin authentication, according to the invention.

As shown in FIG. 3, full verification by the recipient of an El-Sig document according to the exemplary embodiment is performed by a recipient using a computing device. If the El-Sig block includes a bar-code, the computing device includes a bar-code reader. The process of authentication can be applied upon receipt of the El-Sig document, or any time afterwards.

By analogy, the recipient can treat the GROWS like a stamped hand-written signature. The recipient retrieves the digital form of the static or watermarked GROWS, the originator's digital signature, and the originator's public key from the El-Sig block. If the El-Sig document is in electronic form, the El-Sig block is merely read from data. If the El-Sig document is in paper form, the El-Sig block is entered into the computer using a bar-code reader. According to this hard-copy option, the GROWS from the El-Sig document is displayed on the computer monitor and can be visually compared to the written signature on the paper document.

The digital signature (from the El-Sig block on the key elements of the document, the GROWS and, optionally, the recipient's identity) is verified using the public key from the El-Sig block. If the notary option was utilized by the user, the notary's public verification key and digital signature on the GROWS is retrieved from the El-Sig block, and the notary's digital signature on the GROWS and user's id are verified.

This second-party verification process gives some assurance to the recipient that the document is authentic if the originator's digital signature verifies. Further, the El-Sig document has a written signature (the GROWS and optionally the printed hand-written signature), and the hand-written signature on the paper and the GROWS are bound (in a paper El-Sig document) by the visual comparison of the written signature and GROWS. The document and GROWS also are bound by the originator's digital signature. In addition, if the notary option is utilized, the identity of the user and the GROWS are bound by the digital signature of the notary on the GROWS and the user's identity.

The process is resistant to counterfeiting of the written signature by the recipient, because the GROWS cannot be used to deduce the DROWS. Further, a user digital signature on the GROWS with the document that it is being applied to backs up the hand-written signature. Also, a counterfeiter cannot reproduce this digital signature without the user's private key, which preferably is kept confidential.

If the watermark option is utilized, the GROWS is watermarked. If a strong watermark process is used, the watermark cannot be erased from the watermarked GROWS, so a would-be counterfeiter cannot remove it. Furthermore, the watermark is either a digital signature that the recipient cannot reproduce, or it is the recipient's id, which points directly to the counterfeiter if counterfeiting is attempted.

The DROWS, if used as part of the biometrics option, is encrypted with a key that is unknown to the recipient, as an additional measure to thwart counterfeiting.

If the second-party verification fails, the recipient can treat the El-Sig document as not authentic. If the second-party verification is successful, but the recipient still requires greater assurance or disputes the verification result, the other elements of the El-Sig block may be used.

Biometrics verification may be used to provide further evidence of intent to sign. The El-Sig document and the originator are needed to perform this verification. The user's El-Sig encryption key is used to recover the CEK from the El-Sig block. The CEK and the optional IV (if provided) are used to decrypt the encrypted digital signature and DROWS. The decrypted digital signature is verified with the document (or predetermined key elements of the document) and GROWS and, optionally, the recipient's id. The DROWS then is verified against the user's hand-written signature biometrics template. The successful verification of these steps provides additional proof of the authenticity of the El-Sig document.

Assurance is stronger than that of second-party verification because only the originator can create a DROWS that verifies successfully with the copy of the written signature biometrics template. Further, only the originator has access to the written signature biometrics template that the DROWS successfully matches, and only the originator and the third-party know the key used to encrypt the digital signature and the DROWS.

As previously noted, third parties are not a necessary part of the process of the present invention, but can be utilized if desired by the originator or recipient. For example, a notary third party can be used, as discussed above. Basically, the notary simply attests to witnessing the hand-written signature of the user. The binding of the user's identity and hand-written signature can be made stronger when the notary inspects documents supporting the identity of the user.

Also as previously discussed, public keys and identities used for digital signatures can be put into a certificate. These certificates may be self-signed, or may be signed by a recognized certificate authority as a third party to the process. It is also possible to use certificates that have already been generated from within a PKI.

In addition, trusted third parties can be used to escrow the user's El-Sig encryption keys and hand-written signature biometrics templates. They will be called upon to do biometrics verification, taking the place of the user. The keys and templates that are escrowed need not be revealed to any other party and preferably remain confidential.

As an additional feature, multiple El-Sig signatures and El-Sig blocks can be added to an El-Sig document that has already undergone the process of the present invention. Subsequently added El-Sig blocks are based on the document, or key elements thereof, and the subsequent signer's GROWS and personal data. The first signer's data is not necessarily a key element for additional signatures. Also, a witness can add his/her El-Sig signature and El-Sig block. In this case, the El-Sig block is created from the witness's personal data and the original signer's El-Sig block, and is not based on the document itself.

General Aspects of the Invention

Initially, it should be noted that the description of the invention makes reference to cryptographic, hashing, and digital certificate schemas, For purposes of illustration, particular schemas will be presented by way of example, and are not limiting of the invention. For example, the U.S. Secure Hash Algorithm ("SHA-1", See FIPS PUB 180-1) will be used when a cryptographic hash algorithm is to be used in connection with the invention. Likewise, a cryptographic asymmetric key digital signature algorithm may be the U.S. Digital Signature Algorithm ("DSA", see FIPS PUB 186); a cryptographic symmetric key encryption algorithm may be a cryptographic symmetric key asynchronous stream encryption algorithm, such as the U.S. Advanced Encryption Standard algorithm (a.k.a. RIJNDAEL used in CFB mode), or a block cipher used in an asynchronous streaming mode, such as cipher feedback; a random, or pseudo-random, number generator may be that provided in Appendix 3 of FIPS PUB 186; and a digital certificate schema may be based on the ISO X.509 standard. All of these exemplary schemas may be replaced by suitable equivalent schemas, within the spirit and scope of the present invention.

Initializing a User

In an exemplary aspect of the invention, a method of electronically signing a document includes initializing a user; and providing an electronic signature for a recipient.

According to the present invention, initializing a user includes generating an asymmetric key pair including a private signing key and a public signing key, and storing the private signing key and the public signing key.

An asymmetric key pair may be generated based on any asymmetric cryptography schema functionally compatible with the present invention, and may be generated randomly or pseudo-randomly. For example, an asymmetric key pair may be generated based on the U.S. Digital Signature Algorithm ("DSA"), which initially requires keying data. Accordingly, prime (p), sub-prime (q) and base (g) parameters may be initially generated randomly or pseudo-randomly, and thereafter used to generate a private signing key. The private signing key and the prime (p) and base (g) parameters are used to generate the corresponding public signing key.

A user provides at least one handwritten signature via a signature input device (e.g., a digitizing tablet), which captures each handwritten signature as signature data. Signature data may include vector data, which may include or define, for example, the speed, direction, etc. of writing (or imprinting) at any particular point. A user may opt, or be required, to provide plural handwritten signatures. For example, to account for the variable nature in handwriting signatures, plural handwritten signatures provide plural instances of signature data, which may be analyzed to provide an average, composite or a most representative instance. Further, plural instances may also provide additional data, such as, for example, tendencies, habits, likely variations, unlikely variations, acceptable margins of error, etc., which may be utilized during the optional user authentication check, as discussed below (e.g., for verification key generation, biometric template comparison).

The private signing key, the public signing key and the document data may be stored for subsequent use.

Providing an electronic signature includes receiving document data corresponding to at least one selected portion of the document, binding the stored private signing key, the stored signature data and the document data to create an electronic signature and providing the electronic signature for a recipient.

Document data corresponds to at least one selected portion of the document to be electronically signed. Portions of the document are selected by the user, by a recipient, by the user and recipient, by an authority, or according to a protocol or custom. A selection protocol may select all portions each time.

Binding the private signing key, the signature data and the document data to produce an electronic signature includes creating the electronic signature based on at least a portion of each of the private signing key, the signature data and the document data in a manner that will reliably re-create the electronic signature given the same private signing key, signature data and document data. Binding may be one-way (i.e., not having an inverse), or two-way. Binding may be based on at least one cryptographic schema (i.e., an asymmetric cryptographic algorithm, a hash algorithm, etc.).

The electronic signature is provided in a manner compatible with the recipient. A compatible manner includes a digital form, readable by the recipient. The electronic signature may be provided in digital form (e.g., on a computer readable medium, through a network to a computer readable medium, etc.) may then be provided for a recipient. The electronic signature may be provided in a computer readable form.

For example, the signature data and the document data may be concatenated, and then encrypted based on the private signing key.

Further, optionally, at least a portion of the user data is utilized to authenticate the user's identity through cryptographic and/or biometric means before permitting the user to electronically sign a document, which also heightens a recipient's level of trust in the reliability of the electronically signed document.

An electronic biometrics template may include biometric data corresponding to the at least one handwritten signature. Additionally, or alternatively, an electronic biometrics template may include data generated based on a mathematical transformation (e.g., a Fourier transformation, a mathematical transformation, etc.) of the digital signals, in whole or in part.

A graphical representation may be graphically formatted data, from which a graphical representation of a handwritten signature may be reproduced. For example, a graphical representation may be in the Graphics Interchange Format ("GIF"), Tagged Image File Format ("TIFF"), etc.

In a further exemplary aspect of the invention, optionally, initializing a user further includes generating a user cryptographic key and/or receiving a user ID; and storing, the user cryptographic key and/or user ID. A user cryptographic key may be used for subsequent purposes as further described herein, and may based on a symmetric cryptographic scheme. Notably, however, a user cryptographic key may be based on an asymmetric cryptographic scheme to the extent desired and consistent with the present invention as described herein. A user ID may be a unique identifier, such as for example, an e-mail address, a social security number, a driver's license number, a legal name, a mailing address and/or etc.

In a further exemplary aspect of the invention, optionally, initializing a user further includes: providing a notary request to a notary entity; receiving a notary response comprising a notary digital signature on at least a portion of the notary request; and storing at least a portion of the notary response.

Illustratively, a notary request may include at least one of the private signing, the public signing key, at least one cryptographic parameter, a user ID, a graphical representation, and other data to the extent desired.

Upon receipt of a notary request, a notary entity may digitally sign at least a portion of the notary request, and provide a notary response including the notary digital signature. For example, a notary may digitally sign the graphical representation and the user ID. Additionally, or alternatively, a notary response may include at least one of a notary public key, a notary ID, a notary digital certificate including the notary public key and the notary ID and a user digital certificate including one or more of the data included in the notary request (e.g., the user ID, the user public signing key and the at least one cryptographic parameter, etc.).

Optionally, before providing the notary response, a notary entity may require the user to provide (optionally in-person) trusted identification supporting the user's identity, such as for example, a passport, a driver's license, etc.

In a further exemplary aspect of the invention, initializing a user further includes generating a verification key; encrypting, based on the verification key, at least one of the private signing key, the public signing key, at least one cryptographic parameter, a user cryptographic key, a user ID, an electronic biometrics template, a graphical representation and at least a portion of a notary response; storing the respective encrypted user data; and optionally, binding the verification key with at least the electronic biometrics template.

A verification key may be generated in any repeatable manner, such that the same verification key may be subsequently generated given the same conditions. Illustratively, a verification key may be generated randomly or pseudo-randomly. Further, a verification key may be bound to the user's electronic biometrics template, and optionally, other data (e.g., other provided or generated data, other user data, user passwords etc.) to provide further binding of the user to the user data.

In another exemplary aspect of the invention, generating a verification key includes receiving a user password from the user; and generating, based on the user password, the verification key. A user password may be any type of data that may be consistently provided by a user, such as for example, alphanumeric data, symbolic data, biometric data, a handwritten signature, etc. Further, a verification key may be generated from a user password in any repeatable and consistent manner, such that the same verification key may be generated each, or most of the, time given the same user password.

In yet another exemplary aspect of the invention, where a user password includes biometric data, generating a verification key includes generating a plurality of cryptographic key splits from seed data; and randomizing the cryptographic key splits to produce the verification key; wherein generating a plurality of cryptographic key splits includes generating a biometric key split based on the user password.

Figure 4:
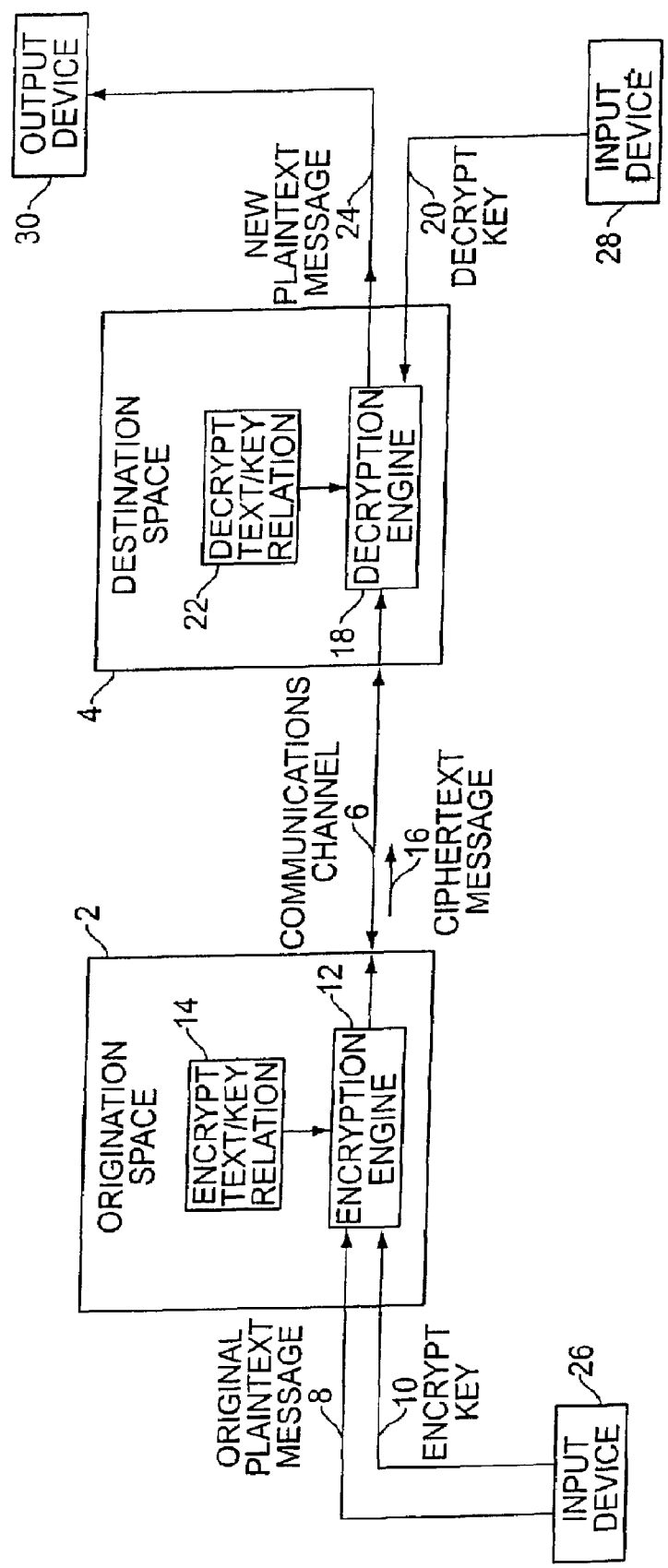
FIG. 4 is a block diagram of a communications event featuring cryptography.

A key split combiner method is as follows. Referring to FIG. 4, a communication has an origination space 2 and a destination space 4. The origination space 2 defines the place and time at which the communication originates. The destination space 4 defines the place and time at which the communication is intended to be decoded. The origination space 2 and the destination space 4 may be remote in location. Alternatively, they may be collocated but displaced in time. The space and time correspondence between the origination space 2 and the destination space 4 depends on the nature of a particular communication. The origination space 2 and destination space 4 are coupled to a common communications channel 6.

This communications channel 6 may bridge a physical space, such as empty air in the case of a cellular voice telephone call. Alternatively, the communications channel 6 may be temporary storage for the communication while time passes between the origination space 2 and the destination space 4, such as a message left in memory on a computer by a first user, for a second user to read at a later time on the same computer. The communications channel 6 may also be a combination of the two, such as telephone cables and storage memory in the case of an electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer may have a certain amount of storage space in the form of memory for storing the text/key relation. A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, or biometrics reader, can also be provided for accepting the key and plaintext message from the origination user, and the key from the destination user. At the destination space 4, an output device 30, such as a monitor, disk drive, or audio speaker, may also be provided to present the new plaintext message to the destination user. The text/key relation can be stored on a floppy disk or other permanent or temporary portable storage, rather than in hard storage in the computer, to allow different text/key relations to be applied by different users or in different situations.

Figure 5:
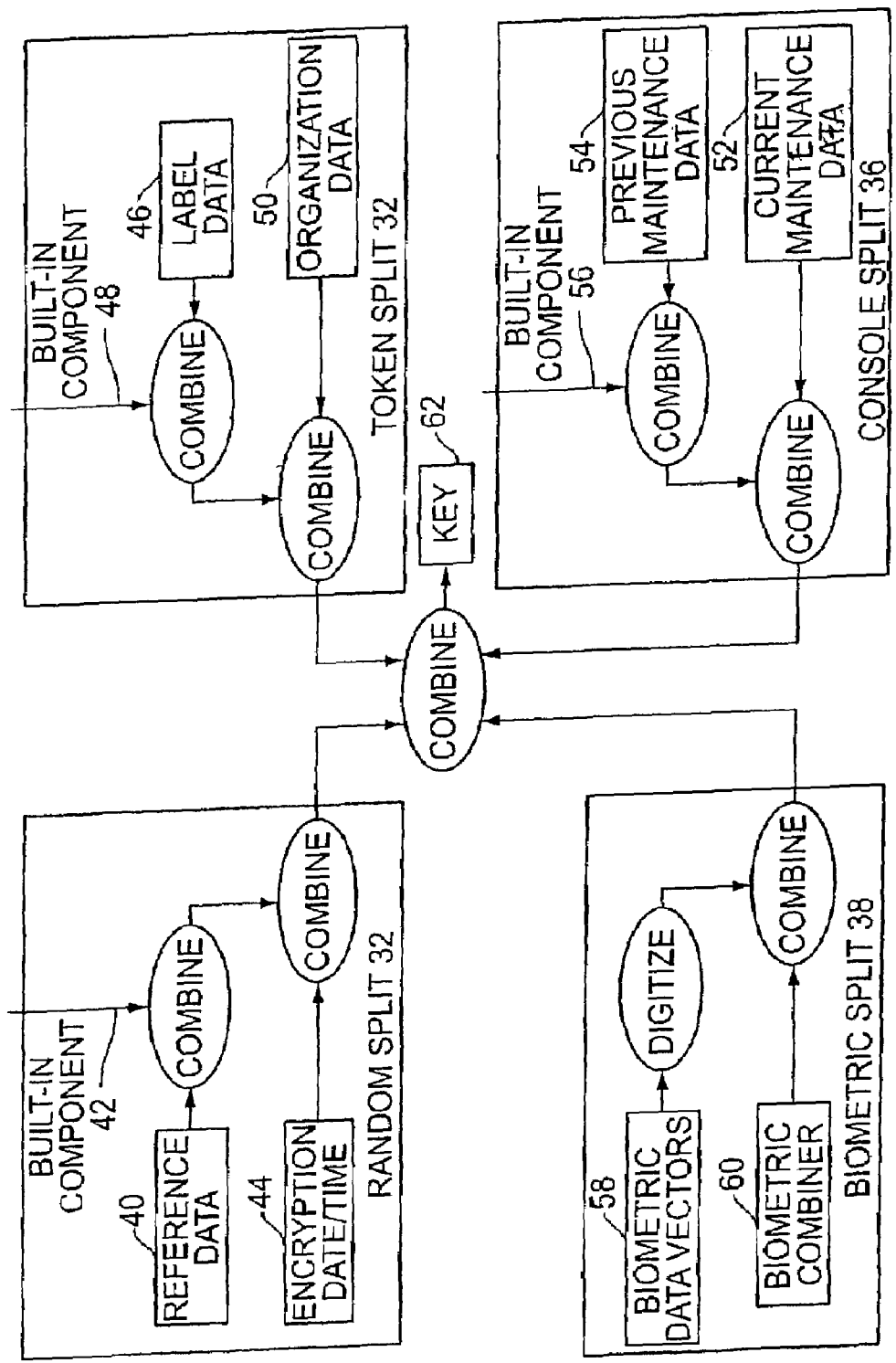
FIG. 5 is a block diagram of a key split combiner.

The keys that are provided at the origination space and at the destination space may be composed of several components, or splits, each of which may be provided by a different source. As shown in FIG. 5, a random key split 32 may be randomly or pseudo randomly generated. A second split 34 may be stored on a token. A third split 36 may be stored on a console, and a fourth split 38 may be provided by a biometric source. The key splits may be combined to form a complete cryptographic key. This key may take the form of a stream of symbols, a group of symbol blocks, an N-dimensional key matrix, or any other form usable by the particular encryption scheme.

The random split 32 provides a random component to the cryptographic key. This split 32 is randomly or pseudorandomly generated based on a seed which is provided by any source as reference data 40. For example, when a user attempts to log on to a system, the date and time of the user's log-on attempt, represented in digital form, can be used as a seed to generate the key split. That is, the seed may be provided to a pseudorandom sequence generator or other randomizer to produce the random split. Such pseudorandom sequence generators are well known in the art. For example, a simple hardware implementation could include a shift register, with various outputs of the register XORed and the result fed back to the input of the register.

Alternatively, the seed may be combined, or randomized, with a built-in component 42, such as a fixed key seed stored at the origination space. The randomization may be performed, for example, by applying a variation of the text/key relation to the generated seed and the stored fixed key seed. This result may be further randomized with, for example, a digital representation of the date and time of the encryption 44, in order to produce the random key split 32.

The token split 34 may be generated in a similar fashion. In this case, the seed is provided on a token, that is, it is stored on a medium that is possessed by the user. For example, the seed may be stored on a floppy disk that the system must read as part of the encryption procedure. The token may store a number of different seeds, or label data 46, each of which corresponds to a different authorization provided by the system or specified by the user. For example, one seed may be used to generate a key split to authorize a particular user to read a message at a particular destination space. Another key seed may be used to generate a key split to authorize any member of a group of users to read a message at any destination space, and for one particular user to read the message and write over the message at a particular destination space. The label data 46 may even designate a window of time during which access to the communication is valid. This seed may be randomized with a built-in component 48, such as a seed stored at the origination space, which may then be further randomized with organization data 50 provided to the organization to which the user belongs.

The console split 36 is derived from a changing value stored at a user space, such as on a system console. Maintenance data, such as the checksum taken from a defragmentation table set, may be used to produce such changing values. For example, the current maintenance data 52 may be randomized with particular previous maintenance data. Alternatively, all previous maintenance data 54 may be randomized with a built-in component 56 stored at the origination space, the results of which are XORed together and randomized with the current maintenance data 52. The randomization result of the changing value is the console split 36.

The biometric split 38 is generated from biometric data vectors 58 provided by biometric sample/s of the user. For example, a retinal scanner may be used to obtain a unique retinal signature from the user. This information, in digital form, will then be used to generate the biometric split 38. This may be accomplished by, for example, randomizing a digital string corresponding to the biometric vectors 58 with biometric combiner data 60, which may be a digital hash of the user's system identification number or some other identifying data that can be linked to the user's physical data provided by the biometric reader.

The resulting randomized data is the biometric split 38. The biometric split 38 provides information that is incapable of being reproduced by anyone but the user providing the biometric data vector 58.

The built-in key split components 42, 48, 56 described herein may be static in that they do not change based on uncontrolled parameters within the system. They may be updated for control purposes, however. For example, the built-in key split components 42, 48, 56 may be changed to modify the participation status of a particular user. The key split component may be changed completely to deny access to the user. Alternatively, only a single prime number divisor of the original key split component may be taken from the key split component as a modification, in order to preserve a legacy file. That is, the user will be able to access versions of the file created prior to the modification, but will not be allowed to change the file, effectively giving the user read-only access. Likewise, modification of the key split component can be effected to grant the user broader access.

Once the key splits 32, 34, 36, 38 have been generated, they may be randomized together to produce the cryptographic key 62 for the communication. In performing each combination to generate the complete cryptographic key, a different variation of the text/key relation may be applied.

The use of a plurality of different text/key relation variations adds to the security of the overall cryptographic scheme. It is contemplated that key splits other than those specifically described herein may be combined in forming the complete key 62. The total number of splits may also vary, and these splits may be used to build a key matrix to add to the complexity of the system. This complete key 62 should be in a form suitable for use in the particular cryptographic scheme.

That is, different fields in the key may have different functions in the protocol of the communication, and should be arranged accordingly within the key.

At the destination space, the process is reversed in order to determine whether a user attempting to access a message has authorization, that is, has the valid key. The key supplied by the user at the destination space must include information required by the labels that were used to create the token split at the origination space. This information may also take the form of a token split. Further, a biometric split may be required as part of the destination key, in order to provide a link between assigned identification data for the user and physical data collected from the user biometrically. The token split and the biometric split may be combined with other splits at the destination space to form the complete destination key.

In another exemplary aspect of the invention, optionally, in initializing a user, at least one of the private signing key, the public signing key, a user cryptographic key, a user ID, at least one cryptographic parameter, the user cryptographic key, the electronic biometrics template and the graphical representation is stored on a token. Accordingly, a user may be required to provide the token in order to electronically sign a document, which further binds the user to an electronically signed document. For example, the private signing key and the user cryptographic key may be stored on a token, which the user must provide in order to electronically sign a document.

In still yet another exemplary aspect of the invention, optionally, initializing a user further includes updating the user password. A user password may be updated based on a fixed time period (e.g., every two weeks, months, etc.), a predetermined number of uses (e.g., every 30 uses, etc.), a predetermined event (e.g., an unsuccessful validation, etc.), or user discretion. For example, in updating a user password, the user supplies the initial user password and a new user password; the initial verification key and a new verification key are generated based on the respective verification keys; and data encrypted based on the initial verification key is decrypted, and then encrypted with the new verification key and thereafter stored.

Electronically Signing a Document

Once a user has been initialized, the user may thereafter electronically sign a document according to the present invention.

In an exemplary aspect of the invention, electronically signing a document includes providing, for a recipient, document data; and providing, for the recipient, signature data; where the document data and/or the signature data is digitally signed with the private signing key and/or encrypted with a shared key.

According to the present invention, document data includes data relating to the document being electronically signed. Document related data may include at least a portion of the document, data derived therefrom and/or data identifying the document. The at least one portion of the document may be selected by the user, or selected based on a predetermined protocol, either of which may include all portions of the document; while document identifying data may include, for example, a unique document or contract number, a contract date, party names, etc.

According to the present invention, signature data may include at least a portion of digital signals corresponding to one or more handwritten signatures and/or data derived therefrom or corresponding thereto (e.g., a graphical representation of a handwritten signature, optionally watermarked; a hash value of the graphical representation or the digital signals, etc.). The digital signals included in signature data may include those received during user initialization, during user authentication (discussed below), and/or ones derived from a stored electronic biometrics template.

Optionally, where the signature data includes a graphical representation of a handwritten signature, the graphical representation may be digitally watermarked with watermarking data, in which the watermarking data is embedded into the graphical representation a predetermined number of times (e.g., once, twice, etc.) in any manner that does not critically corrupt the graphical representation and allows subsequent identifiable extraction of at least a portion of the watermarked data. Watermarking data corresponds to one or more of, in whole or in part, a recipient ID, document data and signature data, with plural data items being combined in any consistent manner. According to the present invention, a watermarked graphical representation is critically corrupted if it may no longer be used to generate a visual representation of a handwritten signature substantially similar to the at least one or more initial handwritten signatures used to generate the graphical representation; while at least a portion of the watermarked data is identifiable when it is more likely than not that it uniquely corresponds to the watermarked data.

Optionally, watermarking data is embedded into the graphical representation in a manner that additionally hides, or makes less apparent, the fact that the watermarked graphical representation is watermarked. Also optionally, watermarked data may be embedded into a graphical representation more than once, to increase the likelihood of a subsequent identifiable extraction; such as, for example, where the watermarked graphical representation has been modified. Also optionally, to improve the likelihood of a subsequent identifiable extraction, before embedding, watermarking data may be compressed in any reliable manner such that the same compressed data is produced each time given the same watermarking data. Watermarking data compression may be reversible (e.g., archival data compression, etc.), or one-way (e.g., hashing, cryptographic hashing).

Optionally, before embedding, the watermarking data may be hashed, which further hides the fact that the graphical representation is watermarked.

In another exemplary aspect of the invention, optionally, electronically signing a document further includes authenticating a user; where providing the document data and providing the signature data require that the user has been successfully authenticated.

According to the present invention, user authentication includes receiving digital signals corresponding to at least one handwritten signature provided by the user and/or receiving a user password provided by the user.

In an exemplary embodiment of the invention, user authentication includes comparing the digital signals to a stored electronic biometrics template to provide an authentication result. In comparing the digital signals to the stored template, the digital signals may be converted to a temporary template, which may then be compared to the stored template. However, where the initial mathematical transformation used to generate the stored template has an inverse, the stored template may be converted to temporary signals, which may then be compared to the digital signals.

Additionally, or alternatively, user authentication includes generating, based on the user password, a verification key; and verifiably decrypting, based on the verification key, at least one of a stored encrypted private signing key, a stored encrypted public signing key, at least one stored encrypted cryptographic parameter, a stored encrypted user cryptographic key, a stored encrypted electronic biometrics template, a stored encrypted graphical representation and a stored encrypted at least a portion of a notary response, to provide an authentication result. As described above, a verification key may be generated in any repeatable manner, such that the same verification key may be subsequently generated given the same conditions. Where a verification key is optionally bound to a stored electronic biometrics template, user authentication via a successful biometrics comparison and/or a successful decryption allows release (or generation) of the verification key.

According to the present invention, document data and/or signature data may be digitally signed with the private signing key, which provided a heightened level of recipient trust in the reliability of the electronically signed document. However, it should be noted that according to the present invention, "digitally signing data with a private signing key" includes encrypting the data, or a cryptographic hash of the data, with the private signing key.

According to the present invention, document data and or signature data may be encrypted with a shared cryptographic key, which provides a heightened level of trust in the reliability of the electronically signed document. Accordingly, a recipient may decrypt the encrypted document data and/or encrypted signature data, which heightens the level of trust in the reliability of the electronically signed document.

According to the present invention, optionally, a shared cryptographic key may be generated based on keying data in any consistent manner, such that the same shared key is generated each time given the same keying data. Keying data corresponds to one or more of, in whole or in part, user data, signature data, document data, notary data, recipient data, device data (e.g., a serial number, unique or pseudo-unique identifier, etc.); and any other selected or generated data. Alternatively, or additionally, a shared key may be generated, in whole or in part, with a cryptographic key split combiner method, which includes generating a plurality of cryptographic key splits from seed data; and randomizing the cryptographic key splits to produce the verification key; where at least one of the seed data corresponds to at least a portion of the keying data. Thus, a recipient may re-generate, with the requisite keying data, the shared key; and decrypt the encrypted document data and/or encrypted signature data to provide heightened trust in the reliability of the electronically signed document.

The depictions of the present invention provided herein are not limiting of the present invention, but rather are exemplary embodiments of the present invention as currently contemplated by the inventor, and may be modified within the spirit and scope of the present invention.

Preferred and alternative embodiments have been described in detail. It must be understood, however, that the invention is not limited to the particular embodiments described herein. Rather, the invention is defined by the following claims, which should be given the broadest interpretation possible in light of the written description and any relevant prior art.

We claim:

1. For an electronic signature device comprising a processor, a memory, a user input device including a first signature input device, and a device interface, all communicatively connected by at least one bus, a method of personalizing the electronic signature device to a user, comprising:
    receiving a digitized written user signature of the user via the first signature input device;
    generating a prime parameter, a sub-prime parameter, and a base parameter;
    generating a signing private key;
    generating a signing public key based on said prime, sub-prime, and base parameters;
    generating a user public key based on said signing private key and said prime and base parameters;
    generating a biometric electronic template based on said digitized written user signature;
    storing said prime, sub-prime, and base parameters, said signing private and public keys, and said biometric electronic template in the memory; and
    printing a graphic indicium that is based at least in part on at least one of the digitized written user signature of the user, the signing private key, the signing public key, the user public key, and the biometric electronic template.

2. The method of claim 1, wherein the graphic indicium is a bar code.

3. The method of claim 1 wherein said prime, sub-prime, and base parameters are based on Diffie-Hellman parameters.

4. The method of claim 1, wherein said prime, sub-prime, and base parameters are generated based on a seed value.

5. The method of claim 4, wherein the seed value is one of a random value and a pseudorandom number.

6. The method of claim 4, wherein the seed value is received from the user via the user interface.

7. The method of claim 1, wherein the user interface further comprises a password input device, and said method further comprises:
    receiving a user password via the password input device;
    generating a password encryption key based on the user password;
    encrypting a known value with the password encryption key to produce an encrypted output; and
    storing the encrypted known value in the memory.

8. The method of claim 7, wherein said known value is said biometrics electronic template.

9. The method of claim 1, wherein the electronic signature device is communicatively connected to a certificate authority via the device interface, and said method further comprises:
    sending a certificate request to the certificate authority;
    receiving a certificate package from the certificate authority; and
    storing said certificate package in the memory.

10. The method of claim 9, wherein said certificate package comprises a digital certificate.

11. For an electronic signature device comprising a processor, a memory having a biometric electronic template, a prime parameter, a sub-prime parameter, and a base parameter, user public data comprising a user public key, and a user private key stored therein, a user interface comprising a signature input device, a device interface adapted to interface a computer, and at least one bus operably connected to the processor, the memory, the user interface, and the device interface, a method of originating an electronically signed transaction, said method comprising:
    verifying whether a user is permitted to originate the electronically signed transaction with the electronic signature device, comprising
        receiving a digitized written originator signature via the user interface, and
        comparing said digitized written originator signature against the biometric electronic template to produce a first verification result;
    receiving a transaction package through one of the user interface and the device interface;
    combining said transaction package and one of said digitized originator signature and a digitized user signature extracted from the biometric electronic template to produce an originator signature block;

generating an ephemeral private key based on the prime, sub-prime, and base parameters;

generating an ephemeral public key based on said ephemeral private key and the prime and base parameters;

generating a shared encryption key based on said ephemeral public key, the user public key, and the prime parameter;

encrypting said originator signature block with said shared encryption key to produce an encrypted signature block;

combining said encrypted signature block, said ephemeral private key, the prime parameter, and at least a portion of the user public data to produce an electronically signed transaction;

if the user is verified, providing said electronically signed transaction via the device interface; and if the user is verified, printing a graphic indicium representing said electronically signed transaction that is based at least in part on at least one of the digitized written user signature of the user, the signing private key, the signing public key, the user public key, and the biometric electronic template.

12. The method of claim 11, wherein the graphic indicium is a bar code.

13. The method of claim 11, wherein the prime, sub-prime and base parameters are based on Diffie-Hellman parameters.

14. The method of claim 11, wherein the user interface further comprises a password input device, the memory has further stored therein an encrypted known value, and verifying whether the user is permitted to originate the electronically signed transaction with the electronic signature device further comprises receiving a user password via the password input device;

generating a password encryption key based on the user password;

decrypting the encrypted known value with said password encryption key to produce a second verification result.

15. The method of claim 14, wherein the encrypted known value is the biometrics electronic template.

16. The method of claim 11, wherein comparing said digitized written originator signature against the biometric electronic template comprises generating a temporary template based on said digitized written originator signature, and comparing said temporary template to the biometric electronic template.

17. The method of claim 11, wherein comparing said digitized written originator signature against the biometric electronic template comprises generating a temporary signature based on the biometric electronic template, and comparing said temporary signature to said digitized written originator signature.

18. The method of claim 11, further comprising binding the graphic indicium to the transaction.

* * * * *